Aug. 21, 1956
J. A. WOFFORD
2,759,395
BINOCULAR MAGNIFIER
Filed April 20, 1953
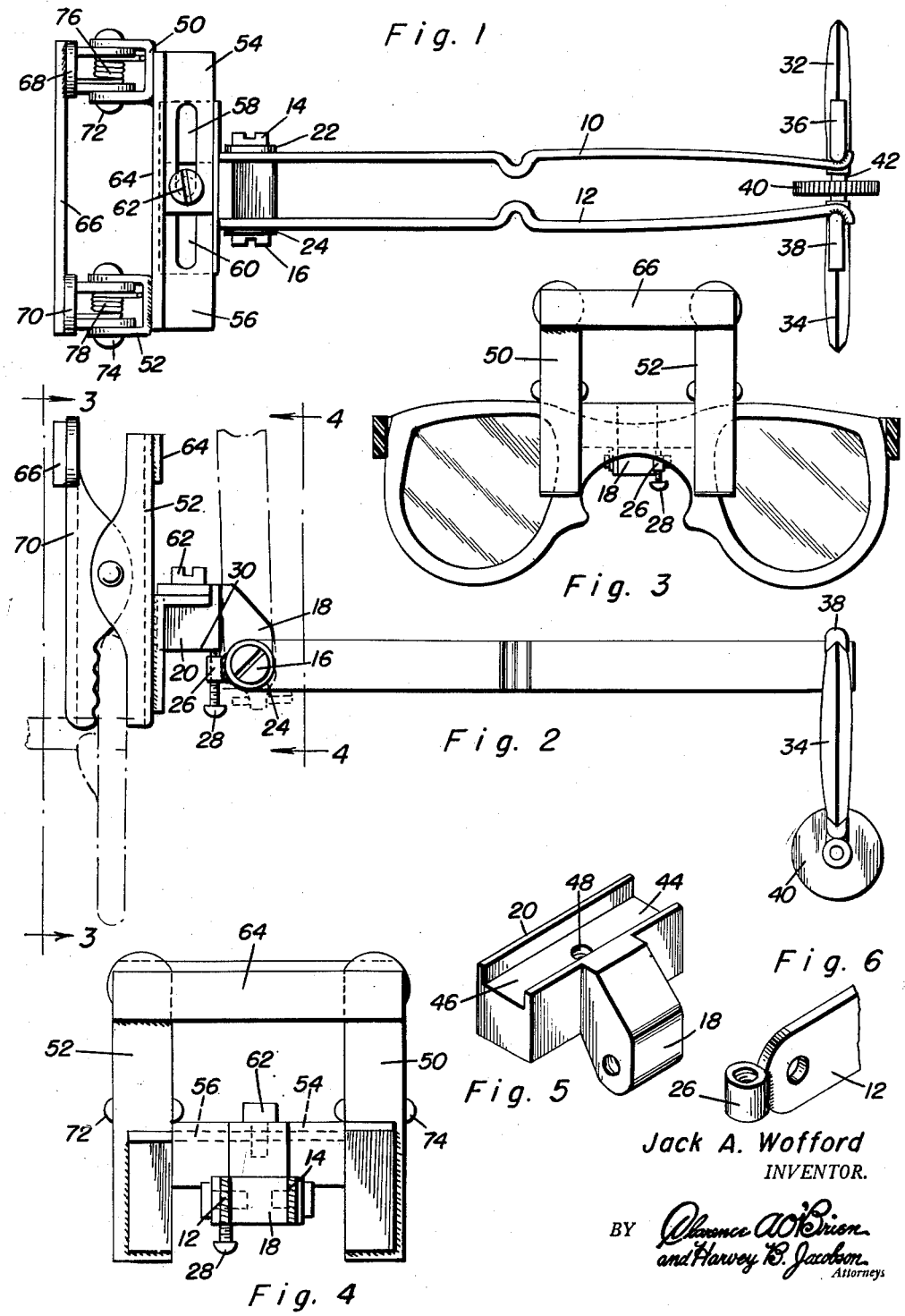
Jack A. Wofford
INVENTOR.
BY *Clarence A. O'Brien*
*and Harvey B. Jacobson*
Attorneys

United States Patent Office 2,759,395
Patented Aug. 21, 1956

2,759,395

BINOCULAR MAGNIFIER

Jack A. Wofford, Forest City, N. C.

Application April 20, 1953, Serial No. 349,617

5 Claims. (Cl. 88—41)

This invention relates to an attachment for spectacles adapted to convert the spectacles to a binocular magnifier or loupe as are highly useful to watchmakers, jewelers, optometrists and others performing work requiring magnification.

The primary object of this invention is to provide an attachment for spectacles which can be adjustably securely fixed to a pair of eyeglasses or spectacles without requiring any change in the structure of the eyeglasses and without requiring any distortion of the spectacles or permanent attachment of means for securing the device to the spectacles.

The construction of this invention features the use of clamp means for securing the device to a pair of spectacles. A bracket is pivotally attached to the arms from which the magnifying lenses depend and means are provided for relatively adjusting and limiting the position of the lens relative to the bracket and hence to the spectacles.

Still further objects of the invention reside in the provision of a binocular magnifier attachment for spectacles that is strong and durable, simple in construction and manufacture, capable of being readily utilized with most of the varying and existing types of spectacles, and which is easy to adjust and utilize.

These, together with the various ancillary objects and features of the invention which will become apparent as the following description proceeds, are attained by this binocular magnifier, a preferred embodiment of which has been illustrated in the accompanying drawings, by way of example only, wherein:

Figure 1 is a top plan view showing the attachment comprising the present invention which is adapted to be installed on eyeglasses;

Figure 2 is a side elevational view showing the manner in which this device is installed on spectacles;

Figure 3 is a vertical sectional view as taken along the plane of line 3—3 in Figure 2;

Figure 4 is a vertical sectional view as taken along the plane of line 4—4 in Figure 2;

Figure 5 is a perspective view of the bracket comprising one of the important elements of the invention; and, Figure 6 is a perspective view illustrating the cylindrical member attached to one of the arms which is employed in providing means for adjusting the arms relative to the bracket.

With continuing reference to the accompanying drawings wherein like reference numerals designate similar parts throughout the various views, reference numerals 10 and 12 generally designate a pair of arms each of which are pivotally mounted by suitable locking screws 14 and 16 in engagement with a downwardly projecting block 18 of a bracket 20, the block 18 being provided with threaded apertures for the reception of the screws 14 and 16. Washers 22 and 24 can, of course, be provided. The arm 12 extends rearwardly beyond the rear faces of the block 18 and terminates in a threaded cylindrical member 26. Threadedly adjustably engaged in the cylindrical member 26 is an adjusting screw 28 which is adapted to adjustably engage the undersurface 30 of the bracket 20. The locking screw 28 limits the lowermost position of the outer ends of the arms 10 and 12 and hence of the lenses 32 and 34 carried in lens holders 36 and 38 respectively, which are attached to the arms 10 and 12. Means including a knurled knob 40 are provided for rotating a screw 42 extending between the lens holders 36 and 38 to vary the separation between the lenses 32 and 34. This structure is defined in the patent to Carl H. O. Wittig, Patent No. 2,155,575, issued April 25, 1939.

The bracket 20 has preferably integrally formed with the block 18 a transverse portion 44 which is provided with a recess 46 therein. A threaded aperture 48 is formed in the transverse portion 44 and opens into the recess 46.

Welded or otherwise secured to clamp elements 50 and 52 are flanges or plates 54 and 56 having slots 58 and 60 therein through which a locking screw 62 extends. The locking screw 62 is threadedly engaged within the recess 48 to hold the clamp elements 50 and 52 in secure engagement with the bracket 20 and permits adjustment of the plates 54 and 56 to account for various sizes of eye glass frames. The clamp elements 50 and 52 are joined by a finger bar 64, the finger bar 64 being welded to clamp element 52 and freely overlying clamp element 50. Another finger bar 66 joins clamp elements 68 and 70 which are pivotally mounted by means of pins 72 and 74 and are positioned in opposition to the clamp elements 50 and 52. The finger bar 66 is welded to clamp element 68 and freely overlies clamp element 70. Each of the clamp elements are provided with a jaw portion adapted to engage a portion of a pair of spectacles or the like. Coil springs 76 and 78 concentric with the pins 72 and 74 continuously urge the jaw portions of the clamp elements into engagement with each other. The use of the flange plates 54 and 56 insure effective positioning of the clamp means relative to the bracket 20. The adjusting screw 28 enables the lenses 32 and 34 to be raised or lowered into alignment with the lenses of the spectacles to which the attachment is secured. The thumb wheel 40 may be used to vary the separation between the lenses 32 and 34 to conform with the interpupilar distance of the user, the lenses of the eyeglasses or spectacles to which the device is attached having been previously adjusted for the interpupilar distance.

Since from the foregoing, the construction and advantages of this binocular magnifier are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

1. An attachment for spectacles to convert said spectacles to a binocular magnifier comprising a bracket, two arms pivotally mounted on said bracket and extending forwardly therefrom, a magnifying lens on each arm, and clamp means attached to said bracket for clampingly detachably securing said attachment to spectacles, said clamp means comprising spaced pairs of clamp elements, each of said clamp elements having a jaw in opposition to a jaw of the other clamp element of that pair of clamp elements, spring means continuously urging said jaws together, and means for attaching said clamp elements to said bracket, said bracket having a recess in the upper edge thereof, at least one flanged member depending from said clamp elements adapted to be received in said recess, and fastening means holding said flanged member in said recess.

2. An attachment for spectacles to convert said spectacles to a binocular magnifier comprising a bracket, two arms pivotally mounted on said bracket and extending forwardly therefrom, a magnifying lens on each arm, means for adjustably limiting the relative pivotal movement of said arms and said bracket in one direction, said last recited means further adjustably maintaining and limiting the position of said arms relative to said bracket, and clamp means attached to said bracket for clampingly detachably securing said attachment to spectacles, said clamp means comprising spaced pairs of clamp elements, each of said clamp elements having a jaw in opposition to a jaw of the other clamp element of that pair of clamp elements, spring means continuously urging said jaws together, and means for attaching said clamp elements to said bracket, said bracket having a recess in the upper edge thereof, at least one flanged member depending from said clamp elements adapted to be received in said recess, and fastening means holding said flanged member in said recess.

3. An attachment for spectacles to convert said spectacles to a binocular magnifier comprising a bracket, two arms pivotally mounted on said bracket and extending forwardly therefrom, a magnifying lens on each arm, means for adjustably limiting the relative pivotal movement of said arms and said bracket in one direction, said means including a threaded cylindrical member attached to one of said arms, an adjusting screw adjustably threadedly secured in said cylindrical member with the upper end of said member engaging said bracket to adjustably maintain and limit the position of said arms relative to said bracket, and clamp means attached to said bracket for clampingly detachably securing said attachment to spectacles, said clamp means comprising spaced pairs of clamp elements, each of said clamp elements having a jaw in opposition to a jaw of the other clamp element of that pair of clamp elements, spring means continuously urging said jaws together, and means for attaching said clamp elements to said bracket, said bracket having a recess in the upper edge thereof, at least one flanged member depending from said clamp elements adapted to be received in said recess, and fastening means holding said flanged member in said recess.

4. An attachment for spectacles to convert said spectacles to a binocular magnifier comprising a bracket, two arms pivotally mounted on said bracket and extending forwardly therefrom, a magnifying lens on each arm, and clamp means attached to said bracket for clampingly detachably securing said attachment to spectacles, said clamp means comprising spaced pairs of clamp elements, each of said clamp elements having a jaw in opposition to a jaw of the other clamp element of that pair of clamp elements, spring means continuously urging said jaws together, and means for attaching said clamp elements to said bracket, and finger bars extending between and secured to said clamp elements in spaced parallel relationship.

5. An attachment for spectacles to convert said spectacles to a binocular magnifier comprising a bracket, two arms pivotally mounted on said bracket and extending forwardly therefrom, a magnifying lens on each arm, means for adjustably limiting the relative pivotal movement of said arms and said bracket in one direction, said means including a threaded cylindrical member attached to one of said arms, an adjusting screw adjustably threadedly secured in said cylindrical member with the upper end of said member engaging said bracket to adjustably maintain and limit the position of said arms relative to said bracket, and clamp means attached to said bracket for clampingly detachably securing said attachment to spectacles, said clamp means comprising spaced pairs of clamp elements, each of said clamp elements having a jaw in opposition to a jaw of the other clamp element of that pair of clamp elements, spring means continuously urging said jaws together, and means for attaching said clamp elements to said bracket, said bracket having a recess on the upper edge thereof, at least one flanged member depending from said clamp elements adapted to be received in said recess, and fastening means holding said flanged member in said recess, and finger bars extending between and secured to said clamp elements in spaced parallel relationship.

References Cited in the file of this patent
UNITED STATES PATENTS

| 1,749,676 | Sadler et al. | Mar. 4, 1930 |
| 2,017,233 | Chester | Oct. 15, 1935 |
| 2,155,575 | Wittig | Apr. 25, 1939 |
| 2,441,453 | Szabo | May 11, 1948 |
| 2,599,716 | May | June 10, 1952 |